May 22, 1956 D. McDONALD 2,747,146

FREQUENCY SENSITIVE CONTROL APPARATUS

Filed Feb. 12, 1952 2 Sheets-Sheet 1

INVENTOR.
Donald McDonald.
BY.
Thiess, Olson & Mecklenburger.
Attys.

May 22, 1956 D. McDONALD 2,747,146

FREQUENCY SENSITIVE CONTROL APPARATUS

Filed Feb. 12, 1952 2 Sheets-Sheet 2

INVENTOR.
Donald McDonald
BY.
Thiess, Olson & Mecklenburger.
Attys.

2,747,146

FREQUENCY SENSITIVE CONTROL APPARATUS

Donald McDonald, Chicago, Ill., assignor to Cook Electric Company, Chicago, Ill., a corporation of Illinois Application February 12, 1952, Serial No. 271,265
16 Claims. (Cl. 317—147)

This invention relates to circuit control apparatus and more particularly to circuit control apparatus responsive to a predetermined range of frequencies of periodic voltage.

It is the principal object of this invention to provide apparatus to control devices within a predetermined range of frequencies of applied voltage.

It is a further object of this invention to provide improved apparatus to control extrinsic circuits or devices with extreme accuracy over a predetermined frequency range, and, if so desired, over a relatively narrow frequency band.

Frequency responsive devices heretofore known have consisted of tuned resonant circuits which control as a function of frequency by utilizing the change in impedance of such tuned circuit which occurs at the resonant frequency. Other devices have employed high or low-pass filters or a band-pass filter network to sense only a desired frequency or band of frequencies and severely attenuate others. Some previously known systems have employed saturable reactors to produce a frequency-voltage characteristic for control purposes.

All of the systems heretofore known have had one or more of the following objectionable shortcomings which the teaching of this invention overcomes. The resonant curves of such tuned circuits and the impedance curves of such filter networks are characterized by gradual slopes determined generally by the circuit components and the load upon the circuit. This gradual slope of the frequency characteristic renders accurate control of an external circuit impossible, and the band width of response variable and dependent upon the amplitude as well as the frequency of the source. Additionally, such tuned devices must be designed to function on relatively small currents or necessarily involve additional amplifiers and controls.

Therefore it is an additional object of this invention to provide a frequency sensitive control device which will be extremely precise in control of the frequency band of response; will be capable of controlling within any desired predetermined band; will be substantially insensitive to changes in the amplitude of the measured voltage, and will be capable of controlling larger currents than is practicable with the circuits heretofore known.

It is a further object of this invention to accomplish the above objects by the use of gas-filled, grid-controlled tubes, or thyratrons, and phase-shifting means to energize the tube grids with a voltage having its phase variable in accordance with frequency.

It is a further object of this invention to provide such frequency sensitive control apparatus especially adapted for aircraft use and sensitive in the frequency range of 380 to 420 cycles per second.

It is an additional object of this invention to control an external load within the range of 380 to 420 cycles and to accurately maintain this range of response to an accuracy of ±1 cycle per second, if desired.

Additional objects of this invention will become manifest from the specification, the accompanying drawings, and appended claims.

In carrying out this invention in one form, two gas tubes are provided and the anode circuit of these tubes includes a differentially connected relay coil to actuate a switch mechanism. The grids of the gas tubes are energized through phase-shifting networks which apply a voltage substantially 180° out of phase with the voltage of the anode circuits. For frequencies below the desired range, both grid voltages will lag the anode voltage by substantially 180° and for frequencies above the desired range, both grid voltages will lead the anode voltage by substantially 180°. As the anode circuit includes a relay coil differentially connected, when both gas-filled tubes are conducting, that is when both grid voltages are leading the anode voltage, the relay will not be actuated. Likewise, when both tubes are non-conducting, that is both grid voltages lag the anode voltage, the relay coil will not be energized at all. Within the frequency range for which this device is designed, one tube will be conducting and the other non-conducting, and over this range the relay coil will be energized and the switch mechanism actuated.

For a more complete understanding of this invention reference should now be made to the accompanying drawings, wherein.

Figure 1:
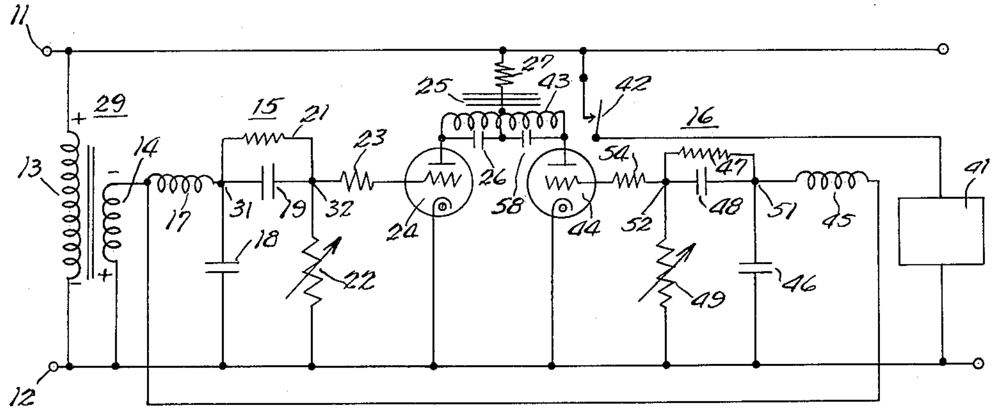
Fig. 1 illustrates one embodiment of this invention which utilizes two grid-controlled gas filled tubes.

Referring now to the drawing and more particularly to Fig. 1, block 41 represents any load such as warning lights, alarms, radio equipment, navigational instruments or the like, which are to be operated only when the frequency of the line voltage present between terminals 11 and 12 is within a predetermined band. The operating band used in this embodiment is 380–420 cycles per second, but it should be clear that the teaching of this invention is applicable for use over any desired frequency band. Normally open switch 42 controls the application of power to the load 41, and is actuated by the differentially wound relay coils 25 and 43. Obviously, a normally closed switch would function in the same manner and is clearly within the scope of this invention. If no current is flowing in either coil, or if substantially equal current is flowing in both coil 25 and coil 43, the switch 42 remains open, but if current flows only in coil 25, the switch is actuated to apply the line voltage to load 41. Gas tube 24 and associated network 15 are so connected that current will flow in coil 25 at all frequencies above the lower limit of the control range, here chosen at 380 cycles. Coil 43 has gas tube 44 associated therewith and is controlled by network 16 which will cause current to flow in coil 43 for all frequencies above the upper limit of the control range, which is here chosen as 420 cycles per second. Thus between 380 and 420 C. P. S. only tube 24 is conducting, coil 25 is energized and thus within this band, switch 42 is closed. The upper and lower limits of this embodiment can be maintained within ±1 C. P. S.

Terminals 11 and 12 represents the output of a 400 cycle aircraft generator source whose frequency is to determine the application of power to the load 41. Transformer 29 has primary winding 13 connected across terminals 11 and 12 and energizes secondary coil 14 which supplies the voltage for phase-shifting networks 15 and 16. Network 15 consists of inductor 17, condenser 18, condenser 19, resistor 21 and rheostat 22. The output of this network is taken across rheostat 22 and applied through grid-current limiting resistor 23 to the grid of a first thyratron 24. The cathode of thyratron 24 is connected to one terminal 12 of the source and the anode of thyratron 24 is connected to relay coil 25 having condenser 26 in parallel therewith which serves as a filter condenser. The other side of coil 25 is connected through current limiting resistor 27 to terminal 11, the other side of the source. Thus alternating voltage of approximately 400 cycles is applied to the cathode-anode circuit of thyratron 24 and the same voltage is applied to the grid of thyratron 24 after passing through phase-shifting network 15.

Figure 2:
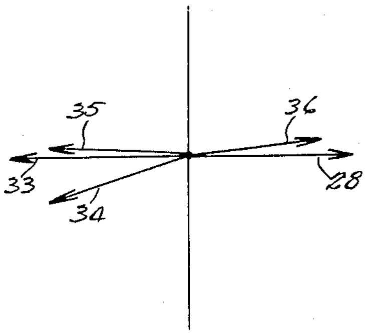
Fig. 2 is a vector diagram of the grid voltages applied to one of the two tubes of Fig. 1 for various frequencies.

The vector diagram, Fig. 2, represents voltages applied to the grid of tube 24 at various frequencies. Vector 28 represents the line voltage which is applied at terminals 11, 12, and consequently, to the anode circuit of tube 24. This voltage undergoes a 180° phase inversion through the transformer 29 and is then applied to substantially the series circuit of coil 17 and condenser 18. Resistors 21 and 22 are sufficiently large that their effect upon this series circuit is small. In the embodiment in which it is desired that tube 24 commences conducting at 380 C. P. S., inductor 17 is a 1 henry coil and condenser 18 is .18 microfarad. Thus the voltage present at point 31 will be substantially in phase with the voltage of transformer secondary 14 for all frequencies substantially below the resonant frequency of the network and will be substantially 180° out of phase with the voltage of the transformer secondary 14 above the resonant frequency. The desired control point, here 380 C. P. S., will be somewhat below this resonant frequency. This voltage is then further shifted in the network consisting of condenser 19 and resistors 21 and 22. For frequencies in the operating range of this apparatus, the impedance of condenser 19 is substantial; approximately the value of resistor 21, and will cause the voltage present at point 32 to lead the voltage present at point 31 by an amount determined by the magnitude of the components. In this embodiment it was found that as rheostat 22 was approximately 1 megohm, resistor 21 approximately 100,000 ohms and condenser 19 approximately .002 microfarads, this network will cause the voltage at point 32 to lead the voltage at point 31 by approximately 15° at the control frequency in the 400 cycle range. Thus in Fig. 2 the voltage of secondary 14 will be substantially 180° out of phase with vector 28 and represented by vector 33. For frequencies below the desired control frequency, the voltage applied to the grid of tube 24 will be represented by vector 34 which is lagging the anode voltage vector 28 by an angle which approaches 180°. At the desired control frequency, which is here the lower control limit, 380 cycles per second, vector 34 will coincide with the position here shown for vector 33 and for all higher frequencies the grid voltage will lead the anode voltage and tube 24 will conduct. This phase shift is represented by vector 35 and is caused by the rotation of the vector representing the voltage at point 31 for increases in frequency and the coincident decrease in the phase angle between the voltages present at points 31 and 32. If the frequency continues to increase, the grid voltage vector continues to rotate and as frequency approaches infinity, the grid voltage will assume the position illustrated by vector 36. Thus the vector will rotate through an angle greater than 180° but the critical control point which gives this structure its sharply defined control characteristics is the frequency at which vector 34 crosses vector 33 and thus shifts from a substantially 180° lagging to leading phase angle with respect to the anode voltage 28, thus causing tube 24 to suddenly go from zero to full conduction, causing actuating current to flow in coil 25. Gas tube 44 controls the current in coil 43 in a similar manner and the grid voltage of tube 44 is supplied from the phase-shifting network 16 which is similar to network 15. The voltage of the transformer secondary 14 is applied to network 16 comprising a series inductor 45 and a network consisting of condenser 46 in parallel with resistor 47, condenser 48, and rheostat 49. As the resistor and rheostat are of large value, this network appears substantially capacitive of approximately the value of condenser 46. Thus the network 16 will have a resonant frequency and for all frequencies below the resonant frequency the voltage at point 51 will be substantially in phase with the voltage of secondary 14, and 180° out of phase with the anode voltage which is applied to tube 44 from terminal 11 through limiting resistor 27 and coil 43.

Figure 3:
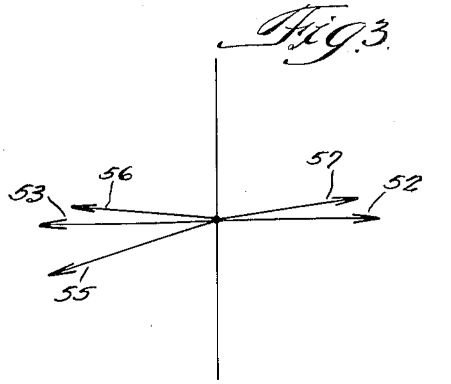
Fig. 3 is a vector diagram of the grid voltages of the second tube of Fig. 1 at various frequencies.

Thus in Fig. 3, which is a vector diagram of grid voltages of tube 44, vector 52 represents the line voltage between terminals 11 and 12 and also the anode voltage of tube 44. Vector 53 represents the voltage of transformer secondary 14 and also approximates the voltage at point 51 for all frequencies substantially below the resonant frequency of the network 16. The network consisting of the parallel combination of resistor 47 and condenser 48 and the series rheostat 49 causes a leading phase shift of the voltage at point 52 with respect to that at point 51. In this embodiment, coil 45 is a 1 henry coil, condenser 46 is .13 microfarads, condenser 48 is .002 microfarads, resistor 47 is 100K ohms and rheostat 49 is approximately 1 megohm. Using these components, the voltage at point 52, and consequently, the voltage applied to the grid of tube 44 through grid current limiting resistor 54 will lead the voltage at point 51 by approximately 15° in the 400 C. P. S. range as indicated above with respect to network 15.

The grid voltage vector will therefore assume the position of vector 55 for all frequencies substantially below the critical control frequency, which is 420 C. P. S. for a network using the components listed above. As the frequency of the source 11, 12 approaches the resonant frequency of network 16, the output vector 55 rotates clockwise and approaches the position here shown for vector 53. When vector 53 rotates to this position, the control voltage at point 52 is 180° out of phase with the anode voltage and no conduction occurs. For a minute frequency increase, the grid voltage vector will rotate toward vector 56, and tube 44, which now has a leading grid voltage, will go into full conduction. Thus for all frequencies above 420 C. P. S. both grids receive voltages which lead the anode voltage, tubes 24 and 44 are conducting and the differentially connected relay is not actuated. As the frequency continues to increase the grid voltage vector will approach position 57 showing a total vector rotation in excess of 180°.

Figure 4:
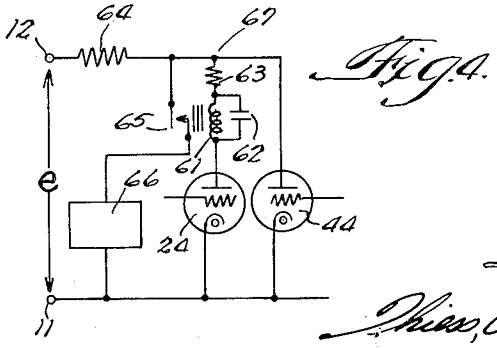
Fig. 4 is an alternate anode connection for the embodiment of Fig. 1 whereby a relay can be used having only a single winding and no center tap connection.

Fig. 4 illustrates an anode connection which can be substituted for that of Fig. 1 which eliminates the need for the center-tapped relay coil 25 and 43. In this modification, the anode 24 is connected to a relay coil 61 having a filter condenser 62 associated therewith. Relay coil 61 is thence connected to current limiting resistor 63 and resistor 64. Tube 44 has its anode connected to the junction of resistors 63 and 64 and the other terminal of resistor 64 is connected to the line terminal 12.

This modification functions as follows: For all frequencies below the control range, the grid voltages on tubes 24 and 44 lag and no conduction occurs. At the lower frequency limit of the control range, the grid voltage on tube 24 begins to lead the anode voltage, tube 24 begins to conduct, energizing coil 61 which actuates the switch 65 and applies voltage to the load 66. Thus power will be available to the load for all frequencies within the control range.

As the frequency increases to the upper limit of the control range, the voltage on the grid of tube 44 assumes a leading phase angle with respect to the anode voltage and tube 44 conducts. As tube 44 has only resistor 64 as a load, the voltage at point 67 will drop to the voltage across the gas tube 44. This is a low voltage, generally of the order of 15 volts, and will be insufficient to maintain the current in relay coil 61 and thus switch 65 will be open. Switch 65 will thus complete the load circuit only within the predetermined range of frequencies in which only tube 24 is conducting.

Figure 5:
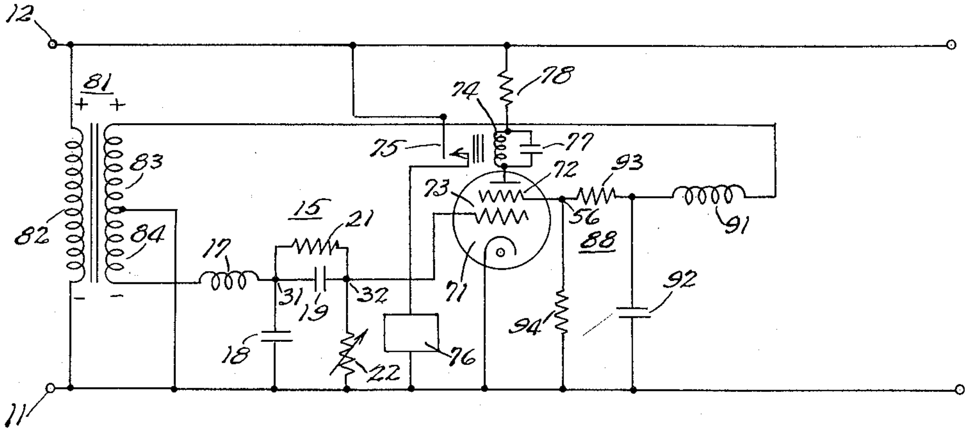
Fig. 5 illustrates a second embodiment of this invention which utilizes a single thyratron using two grids.

The embodiment of Fig. 5 utilizes a single control tube 71 which is a gas-filled tube having two grids, a shield grid 72 and a control grid 73. Tube 71 controls the current in relay coil 74 which is connected to its anode, and has associated therewith switch 75 which will control the application of power to the load 76 which is to receive only voltage having a frequency within a predetermined range. Coil 74 has a parallel condenser 77 adapted to filter the pulsating current output of the gas tube 71 generally called a filter condenser, and resistor 78 is connected in series with coil 74 and back to the source terminal 12.

Figure 6:
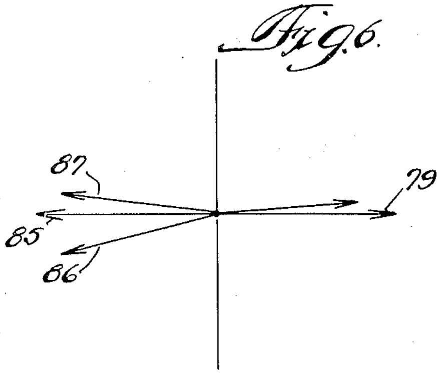
Fig. 6 is a vector diagram of the voltages applied to the first grid of the thyratron of Fig. 5.

The control grid 73 is energized by network 15 which includes inductor 17, condenser 18, condenser 19, resistor 21 and rheostat 22. This network has the same components and operates in the same manner as network 15 in Fig. 1 which is described above. Fig. 6 is a vector diagram of the control grid voltage, that is, the voltage at point 32. As explained above, vector 79 represents the voltage at terminal 12 and is the anode voltage of gas tube 71. Transformer 81 has a primary winding 82 and a center-tapped secondary 83, 84. Winding portion 84 is wound in a manner to produce a 180° phase shift and its output voltage is represented in Fig. 6 by vector 85 and as described above with respect to Fig. 1, the voltage at point 31 is substantially in phase with the secondary vector 85 for all voltages substantially below the resonant frequency. In this embodiment the resonant frequency of network 15 would fall within the desired control range of the apparatus. The portion of the network consisting of condenser 19, resistor 21 and rheostat 22 produces a small leading phase angle in the output at point 32 as represented by vector 86.

As the line frequency approaches the lower limit of the response range of this device, vector 86 rotates in a clockwise direction. Vector 86 will cross the abscissa at the lower frequency limit and will approach the position illustrated by vector 87. At the frequency at which the vector of the output of network 15 crosses the abscissa, tube 71 will commence conduction as the vector has gone from substantially a 180° phase lag to substantially a 180° phase lead. The tube 71 will go from zero to full conduction instantaneously. This frequency at which full conduction begins can be accurately determined by the adjustment of rheostat 22. The frequency at which conduction begins can also be maintained within ±1 cycle per second.

Thus, for all frequencies below the lower limit of the frequency response range, tube 71 is in a non-conducting state and for all frequencies above the lower limit of the frequency response range, the voltage on grid 73 will lead the anode voltage and tend to cause tube 71 to conduct.

Figure 7:
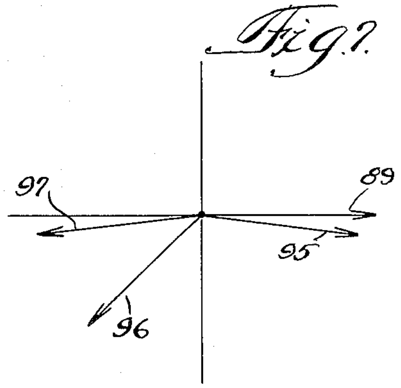
Fig. 7 is a vector diagram of the grid voltages applied to the second grid of the thyratron of Fig. 5.

Network 88 is designed to determine the upper limits of the frequency response range of this device. The winding 83 of the secondary of transformer 81 is wound in a sense to give an output voltage which is in phase with the voltage applied to primary winding 82. This secondary voltage is applied to network 88 to produce a phase shift which varies with frequency and the output taken at point 56 is thence applied to shield grid 72 of gas tube 71. Figure 7 is a vector diagram of the output of network 88. Vector 89 represents the line voltage and also the secondary voltage of winding 83. This voltage is applied through series inductor 91 to the parallel circuit which includes condenser 92 and voltage divider resistors 93 and 94. Resistors 93 and 94 are of sufficient magnitude that their effect upon the series LC circuit is negligible. For low frequencies, the voltage vector, which is applied to grid 72 is represented by vector 95, which means that the voltage vector applied to 72 is substantially in phase with the output voltage of secondary winding 83 for all frequencies below the resonant frequency of the LC circuit. As the line frequency approaches the resonant frequency of network 88, the grid voltage vector begins to rotate clockwise and at the upper limit of the control range the grid voltage vector has assumed the position of vector 96 and at this point the grid voltage vector 96 is lagging the anode voltage 89 by an angle sufficient to prevent conduction over a major portion of a cycle. Thus shield grid 72 remains negative while the anode voltage is positive and conduction cannot occur though the voltage on control grid 73 may tend to cause conduction. At this point relay coil 74 will be de-energized and the upper limit of the frequency response range will be thus determined. As the line frequency continues to increase, the grid voltage vector will continue to rotate and approach the position of vector 97 as frequency approaches infinity.

Thus a simple inexpensive device is taught which is capable of controlling the application of electrical power to extrinsic loads as a function of the frequency of a voltage source. It is possible to control the response range within any predetermined limits and the limits can be controlled precisely within very close tolerances.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Circuit control apparatus connected to a periodic voltage source and adapted to respond to voltage of said source having a frequency within a predetermined range, comprising a gas-filled multigrid control tube having its cathode connected to one side of said source, a relay having a coil in series relationship with the anode of said control tube and connected to the other side of said source, phase-shifting means energized by the source voltage to energize a first grid of said control tube with a lagging phase for frequencies below the lower limit of such a predetermined range and a leading phase for frequencies above said lower limit, and second phase-shifting means energized by the source voltage to energize a second grid of said control tube with a voltage having a lagging phase increasing in magnitude and phase angle as said frequency increases and adapted to prevent conduction in said control tube for frequencies above such a predetermined range.

2. Circuit control apparatus connected to a periodic voltage source and adapted to respond to voltages of said source having frequencies within a predetermined range, comprising two gas-filled grid controlled tubes having cathodes connected to one side of said source, a relay having a coil connected between the anodes of said tubes, said coil having a center tap connected to the other side of said source, first phase-shifting means energized by said source and energizing the control grid of the first of said tubes to produce a lagging voltage for frequencies below said predetermined range, and a leading voltage within and above said range, and second phase-shifting means energized by said source and feeding the grid of the second of said tubes to produce a lagging voltage below and within said predetermined range and a leading voltage for frequencies above said range.

3. Circuit control apparatus connected to a periodic voltage source and adapted to respond to voltages of said source having frequencies within a predetermined range, comprising two gas-filled grid controlled tubes having cathodes connected to one side of said source, a relay having a coil connected between the anodes of said tubes, phase-shifting means energized by said source adapted to feed a voltage to the grid of the first of said tubes which has a lagging phase for all frequencies below said predetermined range and a leading phase within and above said predetermined range, second phase-shifting means energized by said source adapted to feed a voltage to the grid of the second of said two tubes which has a lagging phase for all frequencies below and within said range, and a leading phase for all frequencies above said range, and resistance means connected from the plate of the second of said tubes to the other side of said source of a magnitude to produce current sufficient for relay operation when the first of said tubes is conducting and to cause a sufficient voltage drop when both tubes are conducting to cause said relay to be de-energized.

4. Circuit control apparatus connected to a periodic voltage source and adapted to respond to voltages of said source having frequencies within a predetermined range, comprising gas-filled grid controlled tube means, a relay including an actuating coil in the anode circuit of said tube means, said relay coil and tube means being energized by said source, and phase-shifting means energized by said source and adapted to energize the grids of said tube means to cause tube conduction for frequencies within said predetermined range and to prevent conduction for all frequencies not within the predetermined range.

5. In circuit control apparatus for controlling circuits above a predetermined limit of frequency of a periodic voltage source, gas-filled grid controlled tube means, a relay having a coil in circuit with said tube means and said source, and phase-shifting means energized by said source controlling said tube means by applying grid voltage thereto having a phase and magnitude varying as a function of frequency, said grid voltage having a lagging phase below said limit, a 180° phase at said limit, and a leading phase above said limit relative to said source.

6. In circuit control apparatus for controlling circuits within a predetermined range of frequency of a periodic voltage source, gas-filled grid controlled tube means, a relay having an operating coil in circuit with said tube means and said voltage source, a phase-shifting means energized by said voltage source controlling the lower frequency limit of said predetermined range by applying a grid voltage to said tube means of varying phase and magnitude which shifts from a lagging phase for frequencies below said lower limit to a leading phase for frequencies above said limit to cause energization of said relay above said limit, and a second phase-shifting means energized by said voltage source controlling the upper frequency limit of said range by applying grid voltages to said tube means which are of increasing magnitude and lagging phase for increasing frequency to cause de-energization of said relay above the upper limit of said range.

7. Circuit control apparatus comprising a gas-filled multigrid control tube, a relay having a coil in the anode circuit of said control tube, a periodic voltage source in series with said relay and control tube to actuate said relay within a predetermined range of frequency of said source, first phase-shifting means energized from said source and energizing a first grid of said control tube adapted to have a lagging phase of substantially 180° for frequencies below said predetermined range, a 180° phase shift at the lower limit of said range and a leading phase angle within and above said range preventing tube conduction below said range, and a phase-shifting means energized from said source energizing a second grid of said control tube to produce a lagging voltage of increasing magnitude and phase angle for increasing frequency to prevent conduction for voltages having a frequency exceeding the upper limit of said predetermined range.

8. In circuit control apparatus for controlling circuits within a predetermined range of frequencies of a periodic voltage source, gas-filled grid-controlled tube means, a relay having an operating coil in circuit with said tube means and said voltage source, a phase-shifting means energized by said voltage source controlling the lower frequency limit of said predetermined range by applying a grid voltage to said tube means of varying phase and magnitude which continuously shifts for frequency increases from a lagging phase approaching 180° for frequencies below said lower limit to 180° at said lower limit and to a leading phase above said limit to cause energization of said relay above said limit, and a second phase-shifting means energized by said voltage source controlling the upper frequency limit of said range by applying grid voltage to said tube means which are of increasing magnitude and lagging phase for increasing frequency to cause de-energization of said relay above the upper limit of said range.

9. Circuit control apparatus connected to a periodic voltage source and adapted to respond to voltages of said source having frequencies within a predetermined range, comprising gas-filled grid-controlled tube means, a relay including an actuating coil in the anode circuit of said tube means, said relay coil and tube means being connected to said source, first phase-shifting means energized by said source and adapted to supply grid voltage to said tube means which will vary in phase and magnitude in accordance with variations in frequency to cause conduction in said tube means and actuation of said relay for all frequencies within and above said predetermined range, and second phase-shifting means energized by said voltage source to supply grid voltage to said tube means which will vary in phase and magnitude for variations in frequency to prevent actuation of said relay for all frequencies above such a predetermined range.

10. Circuit control apparatus connected to a periodic voltage source and adapted to respond to voltages of said source having frequencies within a predetermined range comprising gas-filled grid-controlled tube means, a relay including an actuating coil in the anode circuit of said tube means, said relay coil and tube means adapted to be energized by said source, first phase-shifting means energized from said source adapted to determine the lower frequency limit of such a predetermined range by applying a grid voltage to said tube means having a lagging phase for all frequencies below the lower limit of such a predetermined range, a 180° phase angle at the lower limit, and a leading phase angle for all frequencies above said lower limit, thus causing said relay to be actuated above said lower limit, and second phase-shifting means energized from said source to apply a grid voltage to said tube means having its phase and magnitude variable with the frequency of said source adapted to prevent actuation of said relay above the upper limit of such a predetermined range.

11. Circuit control apparatus to be connected to a periodic voltage source and adapted to respond to voltages of said source having frequencies within a predetermined range comprising a pair of gas-filled grid controlled tubes, a relay including an actuating coil in the anode circuits of said tubes, said relay coil and tubes being connected to said source, first phase-shifting means energized by said source and adapted to supply grid voltage to the first of said tubes which will vary in phase and magnitude in accordance with variations in frequency to cause conduction in said first tube and actuation of said relay for all frequencies within and above said predetermined range, and second phase-shifting means energized by said voltage source to supply grid voltage to the second of said tubes which will vary in phase and magnitude for variations in frequency to prevent actuation of said relay for all frequencies above such predetermined range.

12. Circuit control apparatus connected to a periodic voltage source to energize a load and adapted to respond to voltages of said source having frequencies within a predetermined range, said apparatus comprising a pair of grid controlled tubes, first phase-shifting means energized by said source and connected to energize a grid of one of said tubes, and second phase-shifting means energized by said source and connected to energize a grid of the other of said tubes, said tubes being connected whereby the differential current in said tubes is applied to the load, said first phase-shifting means producing a substantially 180° phase shift in the voltage applied to the grid of said first tube at the lower frequency limit of said range and said second phase-shifting means producing a substantially 180° phase shift in the voltage applied to the grid of said second tube at the upper frequency limit of said range.

13. Frequency sensitive apparatus responsive to frequencies of a periodic voltage source above a predetermined limit comprising gas filled grid controlled tube means having a plate circuit energized from said voltage source, sensing means in said plate circuit actuated by current flow therein, and phase-shifting means energized by said source, the output of said phase-shifting means being applied to a grid of said tube means, said phase-shifting means producing a voltage at said grid having a lagging phase below said limit, a 180° phase at said limit and a leading phase above said limit with respect to the voltage applied to said plate circuit.

14. Frequency sensitive apparatus responsive to frequencies of a periodic voltage source above a predetermined limit comprising gas filled grid controlled tube means having a plate circuit energized from said voltage source, sensing means in said plate circuit actuated by current flow therein, first phase-shifting means energized by said source, the output of said phase-shifting means being applied to a grid of said tube means, said phase-shifting means producing a voltage at said grid having a lagging phase below said limit, a 180° phase at said limit and a leading phase above said limit with respect to the voltage applied to said plate circuit, and second phase shifting means energized by said source, the output of said second phase-shifting means being applied to a grid of said tube means, said second phase-shifting means producing a voltage at said grid of substantially 180° lagging phase relative to the voltage on said plate circuit for frequencies which exceed said limit by more than a predetermined amount.

15. Circuit control apparatus responsive to frequencies of a periodic voltage source within a predetermined range comprising gas-filled multigrid tube means having a plate circuit energized from said voltage source, a relay having a coil in said plate circuit, and phase-shifting means energized from said source and energizing a grid of said tube, said phase-shifting means producing a lagging phase in its output for all frequencies of said source below said range, and a leading phase for frequencies within and above said range.

16. Circuit control apparatus responsive to frequencies of a periodic voltage source within a predetermined range comprising a gas filled multigrid control tube having a plate circuit energized from said voltage source, a relay having a coil in said plate circuit, first phase shifting means energized from said source and energizing a grid of said tube, said phase shifting means producing a lagging phase in its output for all frequencies of said source below said range and a leading phase for frequencies within and above said range, and second phase shifting means energized from said source and energizing a grid of said tube to produce a lagging voltage of increasing phase angle and magnitude for increases in frequency to prevent conduction when the applied frequency exceeds the upper limit of said range.

References Cited in the file of this patent

UNITED STATES PATENTS

| | | |
|---|---|---|
| 1,794,932 | Usselman | Mar. 3, 1931 |
| 2,100,394 | Heising | Nov. 30, 1937 |
| 2,448,526 | Gross | Sept. 7, 1948 |

OTHER REFERENCES

"General Electric Review," July 1929, vol. 32, No. 7, pp. 393–395..